United States Patent [19]

Sanada et al.

[11] Patent Number: 5,605,753

[45] Date of Patent: Feb. 25, 1997

[54] MAGNETO-PLUMBITE FERRITE PARTICLES FOR MAGNETIC CARD, PROCESS FOR PRODUCING THE SAME, AND MAGNETIC CARD USING THE SAME

[75] Inventors: Kazutoshi Sanada; Shigehisa Yamamoto, both of Hiroshima, Japan

[73] Assignee: Toda Kogyo Corporation, Japan

[21] Appl. No.: 187,043

[22] Filed: Jan. 27, 1994

[30] Foreign Application Priority Data

Jan. 28, 1993 [JP] Japan .................................. 5-034084

[51] Int. Cl.$^6$ .............................. H01F 1/03; C04B 35/00; G11B 5/66; G11B 5/70

[52] U.S. Cl. ......................... 428/332; 148/100; 148/105; 252/62.51; 252/62.54; 252/62.59; 252/62.63; 428/335; 428/694 B; 428/694 BA; 428/694 BH; 428/900

[58] Field of Search .................. 428/694 B, 694 BA, 428/402, 694 BH, 900, 337, 332, 335; 252/62.51, 62.62, 62.56, 62.59, 62.6, 62.54; 148/100, 105, 121, 122

[56] References Cited

U.S. PATENT DOCUMENTS

| | | | |
|---|---|---|---|
| 4,770,933 | 9/1988 | Kitahata et al. | 428/323 |
| 4,781,981 | 11/1988 | Katamoto et al. | 428/403 |
| 4,788,095 | 11/1988 | Machida et al. | 428/172 |
| 4,828,916 | 5/1989 | Yamamoto et al. | 428/329 |
| 5,055,322 | 10/1991 | Yamamoto | 427/128 |
| 5,118,575 | 6/1992 | Maekawa et al. | 428/403 |

FOREIGN PATENT DOCUMENTS

| | | |
|---|---|---|
| 0332990 | 9/1989 | European Pat. Off. . |
| 62-51026 | 3/1987 | Japan . |
| 62-132732 | 6/1987 | Japan . |
| 62-216922 | 9/1987 | Japan . |
| 2-296303 | 12/1990 | Japan . |

OTHER PUBLICATIONS

Abstract Derwent WPI EP 0 332 990 89-271790/38.
Abstract No. JP 62123023 Apr. 6, 1987 Appln. No. JP850262139 Nippon Zeon Co. Ltd. Magnetic Powder for Magnetic Recording.
IEEE Transactions on Magnetics vol. 26, No. 1, Jan. 1990, N.Y. pp. 12–14 Gornert et al.

Primary Examiner—Paul J. Thibodeau
Assistant Examiner—Stephen Sand
Attorney, Agent, or Firm—Nixon & Vanderhye

[57] ABSTRACT

Disclosed herein is magneto-plumbite ferrite particles for magnetic cards, which are represented by the following general formula:

$$AO \cdot n\{(Fe_{1-(a+b)}Bi_a M_b)_2 O_3\}$$

wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200, and in which the change of the coercive force with temperature in the temperature range of −10° to 120° C. is −1.5 to +1.5 Oe/°C.

6 Claims, No Drawings

MAGNETO-PLUMBITE FERRITE PARTICLES FOR MAGNETIC CARD, PROCESS FOR PRODUCING THE SAME, AND MAGNETIC CARD USING THE SAME

BACKGROUND OF THE INVENTION

The present invention relates to magneto-plumbite ferrite particles for magnetic cards, a process for producing the same and a magnetic card using the same. More particularly, the present invention relates to magneto-plumbite ferrite particles for magnetic cards, which have an appropriate coercive force and an excellent temperature stability, especially magneto-plumbite ferrite particles in which the change of the coercive force with temperature in the temperature range of −10° to 120° C. is −1.5 to +1.5 Oe/°C., a process for producing such magneto-plumbite ferrite particles, and a magnetic card using such magneto-plumbite ferrite particles.

Magnetic cards. i.e., cards having a magnetized stripe portion wherein data can be stored, have recently spread, as are represented by ID cards, credit cards, railroad tickets, season tickets, highway passes, telephone cards and prepaid railway cards.

Magnetic cards are generally produced by a method of applying a magnetic coating which is obtained by kneading magnetic particles with a vehicle, directly to a card substrate, a method of adhering a magnetic tape which is obtained by applying a magnetic coating to a base film, to a card substrate, or the like.

Such a magnetic card is constantly carried and frequently used both indoors and outdoors throughout the country which have different climates such as temperature and humidity. It is, therefore, necessary that a magnetic card stands use under severe conditions.

In order to produce such a magnetic card, it is necessary to use ferromagnetic particles having an appropriate coercive force and an excellent temperature stability.

As the ferromagnetic particles, magneto-plumbite ferrite particles are generally known.

Since the coercive force of magneto-plumbite ferrite particles is high, it is generally required to reduce the coercive force to 300 to 3000 Oe. In order to reduce the coercive force of magneto-plumbite ferrite particles to an appropriate coercive force, a method of substituting a part of Fe(III) of a ferrite by a substituting element such as cobalt (Co) and titanium (Ti) is proposed.

In addition, magneto-plumbite ferrite particles are strongly required to have a magnetic stability (especially, a stability of the coercive force) with respect to temperature (hereinunder referred to as "temperature stability").

The reason why the temperature stability is important in a magnetic card is as follows. Magnetic recording is performed by magnetizing the magnetic particles in a magnetic card by the magnetic field produced from a magnetic head. The magnetic field of the magnetic head and the coercive force as the magnetizing component of the magnetic particles are adjusted at room temperature so as to enable the optimum recording. However, when the coercive force varies with a rise in the ambient temperature due to a change in the atmosphere, the recording and reproducing characteristics greatly change with the ambient temperature, so that the optimum recording is impossible.

Magneto-plumbite ferrite particles for magnetic cards which have an appropriate coercive force and an excellent temperature stability are thus strongly demanded, but the coercive force of general magneto-plumbite ferrite particles are apt to increase with a rise in the temperature, namely, they are poor in the temperature stability. Since the change of the coercive force with temperature of conventional magneto-plumbite ferrite particles is as large as +4 Oe/°C. they are not appropriate as a magnetic particles for magnetic cards.

Methods of improving the temperature stability of magneto-plumbite ferrite particles in order to solve the above problem are proposed in, for example, Japanese Patent Application Laid-Open (KOKAI) Nos. 62-51026 (1987), 62-132732 (1987), 62-216922 (1987) and 2-296303 (1990).

Japanese Patent Application Laid-Open (KOKAI) No. 62-51026 (1987) discloses a magnetic powder for high-density magnetic recording, comprising hexagonal ferrite particles which have an average particle diameter of 0.02 to 0.2 µm and a coercive force of 200 to 2000 Oe and which contain 0.1 to 1.0 Sn atom based on one chemical formula.

In the specification of Japanese Patent Application Laid-Open (KOKAI) No. 62-51026 (1987), there is a description of "If the average particle diameter is less than 0.02 µm, the magnetization and the coercive force reduce so much as to reduce the recording output of a magnetic recording medium, while if the average particle diameter exceeds 0.2 µm, the coercive force reduces and the noise at the reproduction greatly increases, and they are reasons that the average particle diameter of the uniaxial anisotropic hexagonal barium ferrite crystals is restricted to 0.02 to 0.2 µm."

Japanese Patent Application Laid-Open (KOKAI) No. 62-132732 (1987) discloses a method of reducing the temperature dependency of the coercive force of magneto-plumbite ferrite particles by restricting the average particle diameter to not more than 1.0 µm, the thickness of a particle in the direction of C-axis to not more than 0.2 µm, and the aspect ratio of a particle represented by the following formula to not less than 5:

$$\text{Aspect ratio} = \frac{\text{(Maximum diameter of plate-like surface (surface C))}}{\text{(Thickness of particle (in the direction of C-axis))}}$$

In the specification of Japanese Patent Application Laid-Open (KOKAI) No. 62-132732 (1987), there is a description of "The average particle diameter of magneto-plumbite ferrite particles used for a product utilizing magnetism is generally not more than 1.0 µm and the particles having a larger diameter do not provide predetermined magnetic characteristics, and this is a reason that the average particle diameter of magneto-plumbite ferrite particles of the present invention is restricted to not more than 1.0 µm."

Japanese Patent Application Laid-Open (KOKAI) No. 2-296303 (1990) discloses a magnetic powder for magnetic recording, which is represented by the following general composition formula:

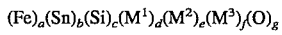

(wherein $M^1$ represents at least one metal element selected from the group consisting of Ba, Sr, Ca and Pb, $M^2$ represents at least one metal element selected from the group consisting of Cr, Y, Ce, Nd, Sm, Al, La and Cd, $M^3$ represents at least one metal element selected from the group consisting of Mg, Ti, Mn, Ni, Cu, Zn, Sb, In, Mo and W, and a, b, c, d, e, f and g respectively represent the number of atoms of Fe, Sn, Si, $M^1$, $M^2$, $M^3$ and O, wherein a is 8.0 to 12.0, b is 0.01 to 6.0, c is 0.05 to 6.0, d is 0.3 to 6.0, e is 0.01 to 6.0, f is 0.0 to 6.0, and g is the number of O atoms which satisfies the atomic values of the other elements), and which has an average particle diameter of not more than 0.08 μm and a plate ratio of not more than 8.

In the specification of Japanese Patent Application Laid-Open (KOKAI) No. 2-296303 (1980), there is a description of "Since the average particle diameter is as small as not more than 0.08 μm, the magnetic powder is suitable for high-density recording, and since the plate ratio is as small as not more than 8, especially, 2 to 5, the packing density in the coating medium is high and it is possible to obtain a magnetic powder having a large saturation magnetization and an excellent dispersibility."

Japanese Patent Application Laid-Open (KOKAI) No. 62-216922 (1987) discloses fine hexagonal ferrite particles for magnetic recording which is represented by the following general formula:

$$AFe_{(12-x-y-z)}Co_xTi_yM_zO_{19}$$

(wherein A represents at least one element selected from the group consisting of Ba, Sr and Pb, M represents at least one substituting element selected from the group consisting of Sb, Sn, W and In, x is 0.5 to 1.1, y is 0.1 to 0.5, and z is 0.1 to 0.5), and which has an average particle diameter of 0.01 to 0.2 μm.

In the specification of Japanese Patent Application Laid-Open (KOKAI) No. 62-216922 (1987), there is a description of "If the average particle diameter of fine hexagonal Co, Ti, M-substituting ferrite particles is less than 0.01 μm, the particles have superparamagnetism so that they are unsuitable as a magnetic recording material, while if the average particle diameter exceeds 0.2 μm, the modulation noise increases so that they cannot be used as a magnetic recording material, and therefore, the fine particles having an average particle diameter of 0.01 to 0.2 μm are selected. From the view point of the improvement of the packing density and the S/N, the average particle diameter is preferably 0.01 to 0.1 μm."

The method disclosed in Japanese Patent Application Laid-Open (KOKAI) No. 62-51026 (1987) improves the temperature stability by adding a predetermined amount of Sn to a hexagonal ferrite. However, the average particle diameter of the hexagonal ferrite particles obtained is so small as 0.02 to 0.2 μm that they are not desirable as magnetic particles for magnetic cards when the recording density, the output, etc., are taken into consideration. As to the change of the coercive force with temperature, when the temperature stability of the hexagonal ferrite particles disclosed in Japanese Patent Application Laid-Open (KOKAI) No. 62-51026 (1987) is measured by a method adopted in the present invention, it is as large as −2 to +4 Oe/°C. That is, the improvement of the temperature stability by the method cannot be said satisfactory.

In the particles disclosed in Japanese Patent Application Laid-Open (KOKAI) Nos. 62-132732 (1987), 62-216922 (1987) and 2-296303 (1990), the change of the coercive force with temperature is also large when measured by a method adopted in the present invention, so that the particles have proved to have a poor temperature stability.

Accordingly, the technical problems of the present invention are to provide magneto-plumbite ferrite particles for magnetic cards which have an appropriate coercive force and a more excellent temperature stability.

As a result of various studies undertaken by the present inventors so as to solve the above-described problems, it has been found that to produce magneto-plumbite ferrite particles which are represented by the following general formula:

$$AO \cdot n\{(Fe_{1-(a+b)}Bi_aM_b)_2O_3\}$$

(wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200), by mixing a compound containing at least one metal selected from the group consisting of barium, strontium and calcium, an iron oxide, a Bi compound, and either a Co compound and an Sn compound or a Co compound, Ti compound and an Sn compound in the above-described stoichiometric amount, and heat-treating the resultant mixture in the presence of a flux of 0.1 to 20 wt % based on the iron oxide at a temperature of not less than a melting point of the flux, the thus-obtained magneto-plumbite ferrite particles have −1.5 to +1.5 Oe/°C. of the change of the coercive force with temperature in the temperature range of −10° to 120° C., an appropriate coercive force and an excellent temperature stability. On the basis of this finding, the present invention has been achieved.

SUMMARY OF THE INVENTION

It is an object of the present invention to provide magneto-plumbite ferrite particles for magnetic cards, which have an appropriate coercive force, e.g., 300 to 3500 Oe and which show an excellent temperature stability, e.g., −1.5 to +1.5 Oe/°C. of the change of the coercive force with temperature in the temperature range of −10° to 120° C.

It is another object of the present invention to provide a magnetic card having an appropriate coercive force and an excellent temperature stability.

To achieve this aim, in a first aspect of the present invention, there are provided magneto-plumbite ferrite particles for magnetic cards, which are represented by the following general formula:

$$AO \cdot n\{(Fe_{1-(a+b)}Bi_aM_b)_2O_3\}$$

(wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200), and in which the change of the coercive force with temperature in the temperature range of −10° to 120° C. is −1.5 to +1.5 Oe/°C.

In a second aspect of the present invention, there is provided a process for producing magneto-plumbite ferrite particles for magnetic cards, which are represented by the following general formula:

$$AO \cdot n\{(Fe_{1-(a+b)}Bi_aM_b)_2O_3\}$$

(wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200), and in which the change of the coercive force with temperature in the temperature range of −10° to 120° C. is −1.5 to +1.5 Oe/°C., comprising the steps of:

mixing a compound containing at least one metal selected from the group consisting of barium, strontium and calcium, an iron oxide, a Bi compound, and either a Co compound and an Sn compound or a Co compound, Ti compound and an Sn compound in the stoichiometric amount in said general formula of said magneto-plumbite ferrite particles; and heat-treating the resultant mixture in the presence of a flux of 0.1 to 20 wt % based on said iron oxide at a temperature of not less than a melting point of the flux.

In a third aspect of the present invention, there is provided a magnetic card comprising:

a non-magnetic substrate; and a magnetic layer provided on at least one part of said non-magnetic substrate and containing the magneto-plumbite ferrite particles which are represented by the following general formula:

$$AO \cdot n\{(Fe_{1-(a+b)}Bi_aM_b)_2O_3\}$$

(wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200), and in which the change of the coercive force with temperature in the temperature range of −10° to 120° C. is −1.5 to +1.5 Oe/°C.

DETAILED DESCRIPTION OF THE INVENTION

The composition of the magneto-plumbite ferrite particles for magnetic cards of the present invention are represented by the formula: $AO \cdot n\{(Fe_{1-(a+b)}Bi_aM_b)_2O_3\}$, wherein n is 5.5 to 6.1, a is 0.001 to 0.010, and b is 0.010 to 0.200.

If n is less than 5.5 or exceeds 6.1, the saturation magnetization of the magneto-plumbite ferrite particles reduces and the coercive force thereof also reduces so much that they are undesirable as magnetic particles for magnetic cards.

If a is less than 0.001, the change of the coercive force with temperature in the temperature range of −10° to 120° C. is out from the range of −1.5 to +1.5 Oe/°C., so that the magneto-plumbite ferrite particles cannot achieve the aim of the present invention. On the other hand, if a exceeds 0.010, the saturation magnetization of the magneto-plumbite ferrite particles reduces so much that they are undesirable as magnetic particles for magnetic cards.

If b is less than 0.010, the change of the coercive force with temperature in the temperature range of −10° to 120° C. is more than +1.5 Oe/°C., so that the magneto-plumbite ferrite particles cannot achieve the aim of the present invention. On the other hand, if b exceeds 0.200, the saturation magnetization of the magneto-plumbite ferrite particles reduces so much that they are undesirable as magnetic particles for magnetic cards.

More specifically, the magneto-plumbite ferrite particles for magnetic cards of the present invention represented by the formula: $AO \cdot n\{(Fe_{1-(a+b)}Bi_aM_b)_2O_3\}$, wherein A represents at least one metal selected from the group consisting of Ba, Sr and Ca, M represents either Co and Sn or Co, Ti and Sn, n is 5.5 to 6.1, a is 0.001 to 0.010, and b is 0.010 to 0.200, have the following characteristics.

(1) The change of the coercive force with temperature in the temperature range of −10° to 120° C. is −1.5 to +1.5 Oe/°C., preferably −1.2 to 1.2 Oe/°C.

(2) The coercive force is 300 to 3500 Oe, preferably 400 to 3000 Oe.

(3) The saturation magnetization is not less than 47 emu/g, preferably not less than 50 emu/g.

(4) The average particle diameter is 0.3 to 3.0 μm, preferably 0.4 to 2.0 μm.

(5) The plate ratio (plate-like surface diameter: thickness) is 2:1 to 10:1.

The method of producing magneto-plumbite ferrite particles for magnetic cards according to the present invention which are represented by the following general formula:

$$AO \cdot n\{(Fe_{1-(a+b)}Bi_aM_b)_2O_3\}$$

(wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200), comprises the steps of:

(i) mixing a compound containing at least one metal selected from the group consisting of barium, strontium and calcium, an iron oxide, a Bi compound, and either a Co compound and an Sn compound or a Co compound, Ti compound and an Sn compound in the above-described stoichiometric amount so as to constitute the above-mentioned composition; and (ii) heat-treating the resultant mixture in the presence of a flux of 0.1 to 20 wt %, preferably 0.5 to 10 wt % based on the iron oxide at a temperature of not less than a melting point of the flux.

As the iron oxide which is used as a raw material in the present invention, iron oxide particles such as hematite, maghemite and magnetite ($FeO_x \cdot Fe_2O_3$ (0<x<1)) are usable. Hydrous ferric oxide particles such as α-FeOOH, γ-FeOOH and β-FeOOH are also usable. As the barium compound, the strontium compound and the calcium compound which are used as the sub-material in the present invention, $BaCO_3$, $SrCO_3$ and $CaCO_3$ are usable. Ba compounds, Sr compounds, and Ca compounds which become BaO, SrO and CaO, respectively when heated, are also usable.

As the Bi compound in the present invention, $Bi_2O_3$, $Bi(OH)_3$, etc. are usable, and Bi compounds which become $Bi_2O_3$ when heated, are also usable.

As the Co compound in the present invention, $CoCO_3$, $Co(OH)_2$, etc. are usable, and Co compounds which become CoO when heated, are also usable.

As the Sn compound in the present invention, $SnO_2$, $SnF_4$, $Sn(OH)_2$, etc. are usable, and Sn compounds which become $SnO_2$ when heated, are also usable.

As the Ti compound in the present invention, $TiO_2$, $Ti(OH)_4$, etc. are usable, and Ti compounds which become $TiO_2$ when heated, are also usable.

As the flux in the present invention, at least one selected from the group consisting of halide, sulfates, silicates of alkaline metals and alkali earth metals, which are ordinarily used is usable. Especially, NaCl, $BaCl_2$, $SrCl_2$, KCl, $Na_2SO_4$, etc. are preferable.

The amount of the flux is 0.1 to 20 wt %, preferably 0.5 to 10 wt % based on the iron oxide used. If the amount of the flux is less than 0.1 wt %, sintering of or between particles is caused in the magneto-plumbite ferrite particles obtained, so that coarse particles and indeterminate particles which disturb the orientation are apt to be produced. Those magneto-plumbite ferrite particles are unsuitable as magnetic particles for magnetic cards. On the other hand, if the amount of the flux exceeds 20 wt %, the plate ratio of the magneto-plumbite ferrite particles obtained increases, so that the dispersibility is lowered. In addition, the existence of a larger amount of flux than necessary is meaningless and uneconomic.

The heat-treating temperature is not less than a melting point of the flux, preferably 900° to 1100° C. If it is less than a melting point of the flux, the reaction is insufficient for producing a ferrite and unreacted constituents remain. If it exceeds 1100° C., sintering between particles may be remarkable, and coarse particles may be apt to be produced, so that the dispersibility may be lowered.

The magnetic card of the present invention comprises a non-magnetic substrate and a magnetic layer provided on at least one part of the non-magnetic substrate and containing magneto-plumbite ferrite particles which are represented by the following general formula:

$$AO \cdot n\{(Fe_{1-(a+b)}Bi_a M_b)_2 O_3\}$$

(wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200), and in which the change of the coercive force with temperature in the temperature range of −10° to 120° C. is −1.5 to +1.5 Oe/°C.

The magnetic card of the present invention is produced by adding magneto-plumbite ferrite particles in the above-described blending ratio to a paint constituent material, and either directly applying the thus-obtained paint composition to at least a part of a non-magnetic substrate, or applying the thus-obtained paint composition to at least a part of a base film and adhering the resultant base film to a non-magnetic substrate.

The paint constituent material used in the present invention comprises a resin, a solvent, and if necessary, a drying promoter, a surfactant, a curing promoter and a coating aid. Further, the paint constituent material used in the present invention may contain an electrical-resistance-adjusting pigment such as carbon, etc. and a head abrasive pigment such as alumina, etc.

As the resin usable herein, acryl resins, alkyd resins, polyesters, polyurethanes, epoxy resins, phenol resins and amino resins which are ordinarily used for the painting, may be exemplified.

As the solvent usable herein, toluene, xylene, butyl acetate, methyl acetate, methyl isobutyl ketone, butyl alcohol, an aliphatic hydrocarbon and the like which are ordinarily used for painting, may be exemplified.

The content of the resin is 10 to 50 parts by weight based on 100 parts by weight of the magneto-plumbite ferrite particles. The content of the solvent is 90 to 300 parts by weight based on 100 parts by weight of the magneto-plumbite ferrite particles.

The content of the electrical-resistance-adjusting pigment and/or head abrasive pigment is not more than 10 parts by weight, preferably not more than 5 parts by weight based on 100 parts by weight of the paint constituent material.

As the drying promoter, the surfactant, the curing promoter and the coating aid which can be blended to the paint constituent material as occasion demands, those known materials used for painting can be used.

As the non-magnetic substrate usable for the magnetic card according to the present invention, sheets of synthetic resins such as polyvinyl chloride, polyesters and polyethylene terephthalate and paper may be exemplified.

The magnetic layer can be formed on the non-magnetic substrate by using a known method, for example, a method described in Japanese Patent Application Laying-Open (KOKAI) Nos. 54-73608 (1979) and 59-92438 (1984).

In the magnetic card according to the present invention, the thickness of the non-magnetic substrate is 100 to 1000 µm, preferably 175 to 750 µm and the thickness of the magnetic layer is 5 to 50 µm. A hiding layer may be formed on the surface of the magnetic layer. The thickness of the hiding layer is 2 to 20 µm.

The magnetic card according to the present invention has the following characteristics.

(1) The coercive force is 300 to 3500 Oe, preferably 400 to 3000 Oe.

(2) The saturation magnetic flux density (Bs) is 1500 to 2500 Gauss, preferably 1650 to 2100 Gauss.

(3) The residual magnetic flux density (Br) is 1200 to 2250 Gauss, preferably 1400 to 1890 Gauss.

(4) The S.F.D. value is 0.10 to 0.5, preferably 0.13 to 0.35.

(5) The change of the coercive force with temperature in the temperature range of −10° to 120° C. is −1.5 to +1.5 Oe/°C.

The reason why the change of the coercive force with temperature of the magneto-plumbite ferrite particles in the present invention is so small as −15 to +15 Oe/°C. is not clear, but since the change of the coercive force with temperature of magneto-plumbite ferrite particles represented by the general formula: $AO \cdot n\{(Fe_{-1(a+b)}Bi_a M_b)_2 O_3\}$, (wherein a is not in the range of 0.001 to 0.010 or b is not in the range of 0.010 to 0.200) is too large to produce a magnetic card having an excellent temperature stability, as shown in later-described comparative examples, the present inventors consider that the change of the coercive force with temperature of the magneto-plumbite ferrite particles of the present invention is lowered due to the synergistic effect of the specified Bi content and the contents of either Co and Sn or Co, Ti and Sn, which are elements for reducing the coercive force.

The magneto-plumbite ferrite particles of the present invention are ferromagnetic particles having an appropriate coercive force and an excellent temperature stability, so that they are useful as magnetic particles for magnetic cards. Also, the magneto-plumbite ferrite particles of the present invention are useful as magnetic particles for magnetic bar-code and magnetic image character recognition.

EXAMPLES

The present invention will now be explained referring to examples and comparative examples.

In the following examples, an average particle diameter (average plate-like surface diameter) and an average thickness are expressed by an average value of the numerical values determined by means of a scanning electron micrograph. The plate ratio thereof are represented by the ratio of the average particle diameter to the average thickness.

The magnetic characteristics of the magnetic particles were measured under an external magnetic field of 10 kOe by a vibration sample magnetometer VSM-35-15 (manufactured by Toei Kogyo, Kabushiki Kaisha).

The change (Oe/°C.) of the coercive force with temperature is expressed by the value obtained by dividing the difference between the coercive force at a temperature of −10° C. and the coercive force at a temperature of 120° C. by the temperature difference (130° C.).

S.F.D. (Switching Field Distribution) value is determined by dividing a half-width value obtained from the differential curve of the demagnetization curve of a sheet-like specimen by using a differentiating circuit of "Vibration Sample Magnetometer, VSM-3S-15", manufactured by Toei Kogyo Kabushiki Kaisha, by the coercive force at the peak of the differential curve thereof, the sheet-like specimens being produced by the Example 8.

Example 1

902.3 g of iron oxide ($\alpha$-Fe$_2$O$_3$), 199.0 g of barium carbonate, 11.9 g of cobalt carbonate, 15.7 g of tin oxide, 4.5 g of bismuth oxide and 45 g of BaCl$_2$ as a flux (which corresponds to 5% by weight based on iron oxide) were adequately mixed. The resultant mixture was charged into an alumina crucible and heat-treated at a temperature of 1000° C. for 2 hours.

After cooling, the heat-treated mixture was pulverized and washed to remove the flux by an ordinary method, and it was filtered and dried to obtain brown particles.

As a result of X-ray diffraction and fluorescent X-ray analysis, the brown particles obtained proved to be magneto-plumbite ferrite particles having the composition of BaO·5.70 $\{(Fe_{0.983}Bi_{0.0017}Co_{0.0080}Sn_{0.0073})_2O_3\}$, and as a result of observation through a scanning electron microscope, these particles proved to have an average particle diameter of 0.70 μm and a plate ratio (plate-like surface diameter: thickness) of 2.9:1.

As to the magnetic characteristics of the BaO·5.70$\{(Fe_{0.983}Bi_{0.0017}Co_{0.0080}Sn_{0.0073})_2O_3\}$ particles, the coercive force Hc was 2730 Oe, the saturation magnetization σs was 62 emu/g, and the change of the coercive force with temperature was +1.2 Oe/°C.

Examples 2 to 7, Comparative Examples 1 to 3

Magneto-plumbite ferrite particles for magnetic cards were produced in the same way as in Example 1 except for varying the kind and the amount of iron oxide, the kind and the amount of sub-material, the kind and the amount of Bi compound, the kind and the amount of coercive force reducing element, the kind and the amount of flux and the heat-treating temperature and time.

The main producing conditions are shown in Table 1 and the properties of the products obtained are shown in Table 2.

Example 8

100 parts by weight of magneto-plumbite ferrite particles produced in Example 1 were blended as a magnetic pigment with a paint constituent material of the following composition, and mixed and dispersed for 4 hours by using a paint shaker (manufactured by Red Devil Limited) (using glass beads 1.5 mm in diameter as a medium) to obtain a paint composition.

| | |
|---|---|
| Magneto-plumbite ferrite particles | 100 parts by weight |
| Surfactant (Wetting agent (Lecithin)) | 0.5 parts by weight |
| Resin | |
| Vinyl resin (VAGF)* | 10 parts by weight |
| Urethane resin (N-2301)** | 10 parts by weight |
| Solvent (MEK/CYCLOHEXANONE/TOLUENE = 14.2/14.1/1) | 146 parts by weight |

(Notes)
*VAGF (vinyl chloride-vinyl acetate copolymer (produced by Union Carbide Corp.)) is used as the solution containing 30 parts by weight of the above vinyl chloride-vinyl acetate copolymer and 70 parts by weight of the Anon.
**N-2301 (urethane resin (produced by Japan Polyurethane Co., Ltd.)) is used as the solution containing 30 parts by weight of the above urethane resin and 70 parts by weight of MEK(methyl ethyl ketone)/Toluene mixture (= 11/3).

The thus-obtained magnetic paint composition was applied to a white polyethylene terephthalate film (non-magnetic substrate, thickness: 188 μm) to form a magnetic layer 7 μm in thickness.

The card produced had a coercive force (Hc) of 2720 Oe, a saturation magnetic flux density (Bs) of 1910 Gauss and a residual magnetic flux density (Br) of 1660 Gauss, a S.F.D. value of 0.27 and the change of the coercive force with temperature was +1.3 Oe/°C.

Examples 9 to 14 and Comparative Examples 4 to 6

Magnetic cards were produced in the same way as in Example 8 except that the magneto-plumbite ferrite particles produced in Examples 2 to 7 and Comparative Examples 1 to 3 were respectively used.

The properties of the magnetic cards obtained are shown in Table 3.

TABLE 1

| Examples and Comparative Examples | Production of magneto-plumbite ferrite particles | | | | | |
|---|---|---|---|---|---|---|
| | Iron oxide | | Sub-material | | Bi compound | |
| | Kind | Amount (g) | Kind | Amount (g) | Kind | Amount (g) |
| Example 1 | α-Fe$_2$O$_3$ | 902.3 | BaCO$_3$ | 199.0 | Bi$_2$O$_3$ | 4.5 |
| Example 2 | " | 838.4 | " | 197.4 | " | 4.2 |
| Example 3 | γ-Fe$_2$O$_3$ | 758.5 | " | 193.7 | " | 3.8 |
| Example 4 | " | 830.4 | Ba(OH)$_2$ | 171.1 | " | 16.6 |
| Example 5 | α-FeOOH | 977.4 | " | 162.9 | " | 17.6 |
| Example 6 | Fe$_3$O$_4$ | 810.4 | SrCO$_3$ | 142.7 | " | 25.2 |
| Example 7 | " | 733.2 | " | 140.8 | " | 22.8 |
| Comp. Example 1 | α-Fe$_2$O$_3$ | 902.3 | BaCO$_3$ | 199.0 | " | — |
| Comp. Example 2 | " | 838.4 | " | 197.4 | " | — |
| Comp. Example 3 | " | 905.2 | " | 201.1 | " | 4.6 |

TABLE 1-continued (II) Production of magneto-plumbite ferrite particles

| Examples and Comparative Examples | Sn compound Kind | Amount (g) | Co compound Kind | Amount (g) | Ti compound Kind | Amount (g) |
|---|---|---|---|---|---|---|
| Example 1 | $SnO_2$ | 15.7 | $CoCO_3$ | 11.9 | — | — |
| Example 2 | " | 75.4 | " | 59.5 | — | — |
| Example 3 | " | 157.0 | " | 118.9 | — | — |
| Example 4 | " | 82.9 | CoO | 51.1 | $TiO_2$ | 11.0 |
| Example 5 | " | 37.7 | " | 23.2 | " | 5.0 |
| Example 6 | " | 75.4 | " | 46.5 | — | — |
| Example 7 | " | 157.0 | " | 93.0 | — | — |
| Comp. Example 1 | " | 15.7 | $CoCO_3$ | 11.9 | — | — |
| Comp. Example 2 | " | 75.4 | " | 59.5 | — | — |
| Comp. Example 3 | " | 7.7 | " | 5.9 | — | — |

(III) Production of magneto-plumbite ferrite particles

| Examples and Comparative Examples | Flux Kind | Amount (g) | Flux/$Fe_2O_3$ (wt %) | Heat treatment Temperature (g) | Time (hr) |
|---|---|---|---|---|---|
| Example 1 | $BaCl_2$ | 45.0 | 5 | 1000 | 2 |
| Example 2 | " | 42.0 | 5 | 1020 | 1 |
| Example 3 | " | 38.0 | 5 | 1050 | 1 |
| Example 4 | $BaCl_2$ | 42.0 | 5 | 1030 | 2 |
|  | NaCl | 42.0 | 5 |  |  |
| Example 5 | $SrCl_2$ | 44.0 | 5 | 1030 | 2 |
|  | NaCl | 44.0 | 5 |  |  |
| Example 6 | $SrCl_2$ | 84.0 | 10 | 1100 | 2 |
| Example 7 | " | 76.0 | 10 | 1100 | 2 |
| Comp. Example 1 | $BaCl_2$ | 45.0 | 5 | 1000 | 2 |
| Comp. Example 2 | " | 42.0 | 5 | 1020 | 1 |
| Comp. Example 3 | " | 45.0 | 5 | 1000 | 2 |

TABLE 2

(I) Production of magneto-plumbite ferrite particles for magnetic cards

| Examples and Comparative Examples | Composition |
|---|---|
| Example 1 | $BaO \cdot 5.70\{(Fe_{0.983}Bi_{0.0017}Co_{0.0080}Sn_{0.0073})_2O_3\}$ |
| Example 2 | $BaO \cdot 5.75\{(Fe_{0.913}Bi_{0.0015}Co_{0.0430}Sn_{0.0425})_2O_3\}$ |
| Example 3 | $BaO \cdot 6.85\{(Fe_{0.826}Bi_{0.0014}Co_{0.0900}Sn_{0.0826})_2O_3\}$ |
| Example 4 | $BaO \cdot 5.76\{(Fe_{0.904}Bi_{0.0060}Co_{0.0460}Ti_{0.0110}Sn_{0.0330})_2O_3\}$ |
| Example 5 | $BaO \cdot 6.05\{(Fe_{0.957}Bi_{0.0061}Co_{0.0199}Ti_{0.0052}Sn_{0.0118})_2O_3\}$ |
| Example 6 | $SrO \cdot 5.95\{(Fe_{0.913}Bi_{0.0090}Co_{0.0401}Sn_{0.0379})_2O_3\}$ |
| Example 7 | $SrO \cdot 6.03\{(Fe_{0.826}Bi_{0.0082}Co_{0.0848}Sn_{0.0810})_2O_3\}$ |
| Comp. Example 1 | $BaO \cdot 5.68\{(Fe_{0.984}Co_{0.0085}Sn_{0.0075})_2O_3\}$ |
| Comp. Example 2 | $BaO \cdot 5.75\{(Fe_{0.913}Co_{0.0440}Sn_{0.0430})_2O_3\}$ |
| Comp. Example 3 | $BaO \cdot 5.76\{(Fe_{0.9915}Bi_{0.0015}Co_{0.0040}Sn_{0.0030})_2O_3\}$ |

(II) Production of magneto-plumbite ferrite particles for magnetic cards

| Examples and Comparative Examples | Average particle diameter (μm) | Plate ratio (—) | Coercive force (Oe) | Saturation magnetization (emu/g) | Change of coercive force with temperature (Oe/°C) |
|---|---|---|---|---|---|
| Example 1 | 0.70 | 2.9:1 | 2730 | 62 | +1.2 |
| Example 2 | 0.81 | 3.2:1 | 1010 | 59 | 0 |
| Example 3 | 0.72 | 3.4:1 | 450 | 52 | −0.7 |
| Example 4 | 0.85 | 4.5:1 | 1100 | 57 | +0.2 |
| Example 5 | 1.70 | 2.7:1 | 2210 | 59 | +0.5 |
| Example 6 | 0.88 | 3.0:1 | 950 | 56 | 0 |
| Example 7 | 1.61 | 3.2:1 | 420 | 50 | −0.1 |
| Comp. Example 1 | 0.65 | 4.5:1 | 2810 | 59 | +3.6 |
| Comp. Example 2 | 0.75 | 4.2:1 | 990 | 57 | +1.9 |
| Comp. Example 3 | 0.71 | 3.3:1 | 2930 | 59 | +2.5 |

TABLE 3

| Examples and Comparative Examples | Kinds of magnetic particles | Magnetic cards | |
|---|---|---|---|
| | | Coercive force Hc (Oe) | Saturation magnetic flux density Bs (Gauss) |
| Example 8 | Example 1 | 2720 | 1910 |
| Example 9 | Example 2 | 1050 | 1830 |
| Example 10 | Example 3 | 480 | 1710 |
| Example 11 | Example 4 | 1140 | 1810 |
| Example 12 | Example 5 | 2180 | 1850 |
| Example 13 | Example 6 | 980 | 1800 |
| Example 14 | Example 7 | 480 | 1890 |
| Comp. Example 4 | Comp. Example 1 | 2770 | 1820 |
| Comp. Example 5 | Comp. Example 2 | 1050 | 1760 |
| Comp. Example 6 | Comp. Example 3 | 2880 | 1810 |

(II)

| Examples and Comparative Examples | Magnetic cards | | |
|---|---|---|---|
| | Residual magnetic flux density Br (Gauss) | SFD (—) | Change of coercive force with temperature (Oe/°C.) |
| Example 8 | 1660 | 0.27 | +1.3 |
| Example 9 | 1610 | 0.15 | +0.2 |
| Example 10 | 1480 | 0.18 | −0.6 |
| Example 11 | 1590 | 0.15 | +0.3 |
| Example 12 | 1680 | 0.25 | +0.7 |
| Example 13 | 1600 | 0.15 | +0.1 |
| Example 14 | 1420 | 0.17 | 0 |
| Comp. Example 4 | 1560 | 0.30 | +3.8 |
| Comp. Example 5 | 1530 | 0.18 | +2.1 |
| Comp. Example 6 | 1550 | 0.29 | +2.8 |

What is claimed is:

1. Magneto-plumbite ferrite particles for magnetic cards which are represented by the following formula:

$$AO \cdot n\{[Fe_{1-(a+b)}Bi_a M_b]_2 O_3\}$$

wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200, wherein the average particle diameter of the magneto-plumbite ferrite particles is 0.3 to 3.0 μm, the plate ratio of the magneto-plumbite ferrite particles is 2:1 to 10:1, the coercive force of the magneto-plumbite ferrite particles is 300 to 3500 Oe, the saturation magnetization of the magneto-plumbite ferrite particles is not less than 47 emu/g, and the change of the coercive force of the magneto-plumbite ferrite particles with temperature in the temperature range of −10° to 120° C. is −1.5 to +1.5 Oe/°C.

2. Magneto-plumbite ferrite particles for magnetic cards according to claim 1, wherein the average particle diameter of the magneto-plumbite ferrite particles is 0.4 to 2.0 μm.

3. Magneto plumbite ferrite particles for magnetic cards according to claim 1, wherein the average particle diameter is 0.4 to 2.0 μm, the plate ratio is 2.5:1 to 10:1, the coercive force is 400 to 3000 Oe, the saturation magnetization is not less than 50 emu/g, and the change of the coercive force of the magnetic card with temperature in the temperature range of −10° C. to 120° C. is −1.2 to +1.2 Oe/°C.

4. A magnetic card comprising:

a non-magnetic substrate of 100 to 1000 μm in thickness, and a magnetic layer of 5 to 50 μm in thickness, provided on at least one part of said non-magnetic substrate and containing magneto-plumbite ferrite particles which are represented by the following formula:

$$AO \cdot n\{[Fe_{1-(a+b)}Bi_a M_b]_2 O_3\}$$

wherein A represents at least one metal selected from the group consisting of Ba, Sr and Ca, M represents either Co and Sn or Co, Ti and Sn, n is 5.5 to 6.1, a is 0.001 to 0.010 and b is 0.010 to 0.200, wherein the average particle diameter of the magneto-plumbite ferrite particles is 0.3 to 3.0 μm, the plate ratio of the magneto-plumbite ferrite particles is 2:1 to 10:1, the change of the coercive force of the magnetic layer on the magnetic card with temperature in the temperature range of −10° C. to 120° C. being −1.5 to +1.5 Oe/°C., the coercive force of the magnetic card being 300 to 3500 Oe, the saturation magnetic flux density of the magnetic card being 1500 to 2500 Gauss, the residual magnetic flux density of the magnetic card being 1200 to 2250 Gauss, and the Switching Field Distribution value of the magnetic card being 0.10 to 0.5.

5. A magnetic card according to claim 4, wherein the coercive force is 400 to 3000 Oe, the saturation magnetic flux density is 1650 to 2100 Gauss, the residual magnetic flux density is 1400 to 1890 Gauss, and the Switching Field Distribution value is 0.13 to 0.35.

6. A magnetic card according to claim 4, wherein said magnetic layer containing the magneto-plumbite ferrite particles contains 100 parts by weight of the magneto-plumbite ferrite particles and 10 to 50 parts by weight of a binder resin based upon 100 parts by weight of the magneto-plumbite ferrite particles.

* * * * *